United States Patent Office 2,899,277
Patented Aug. 11, 1959

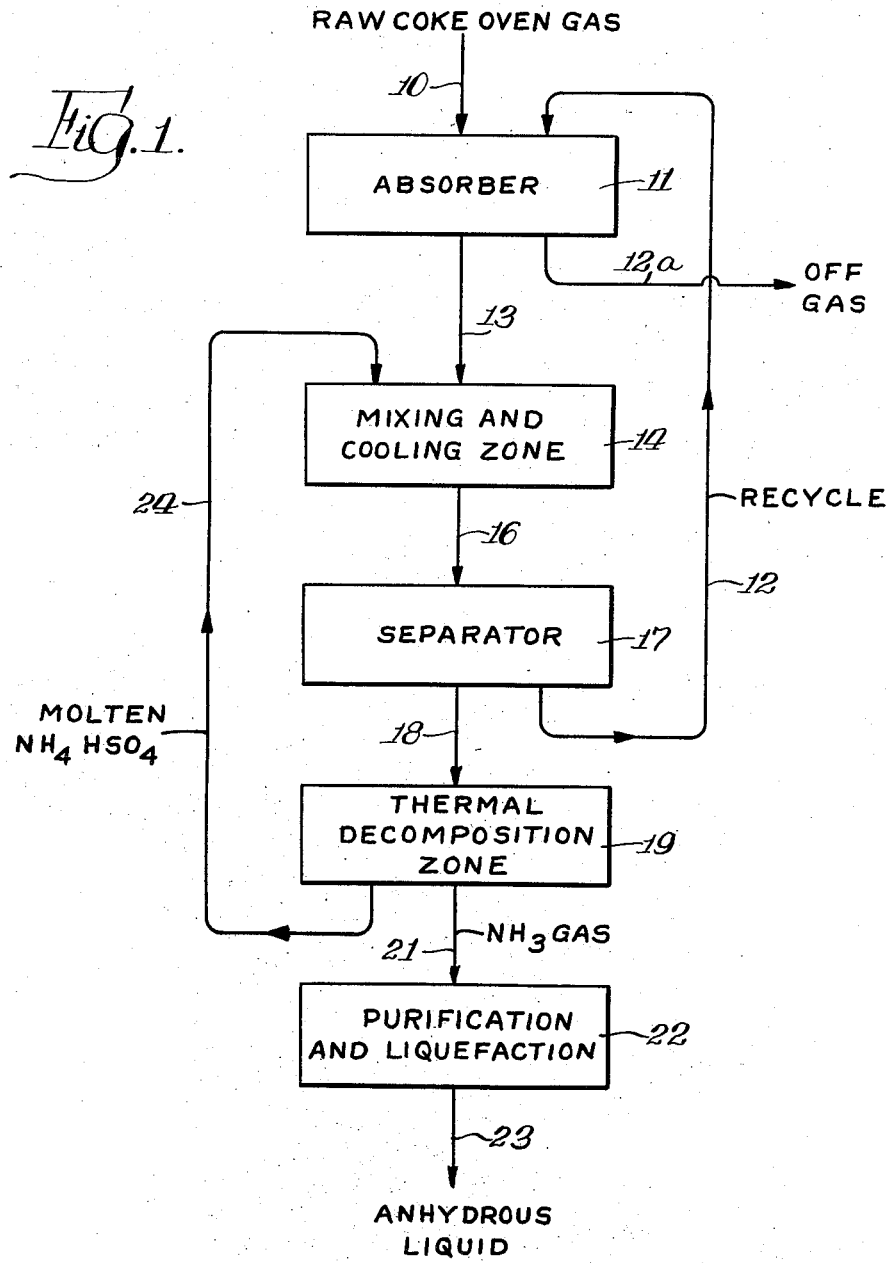

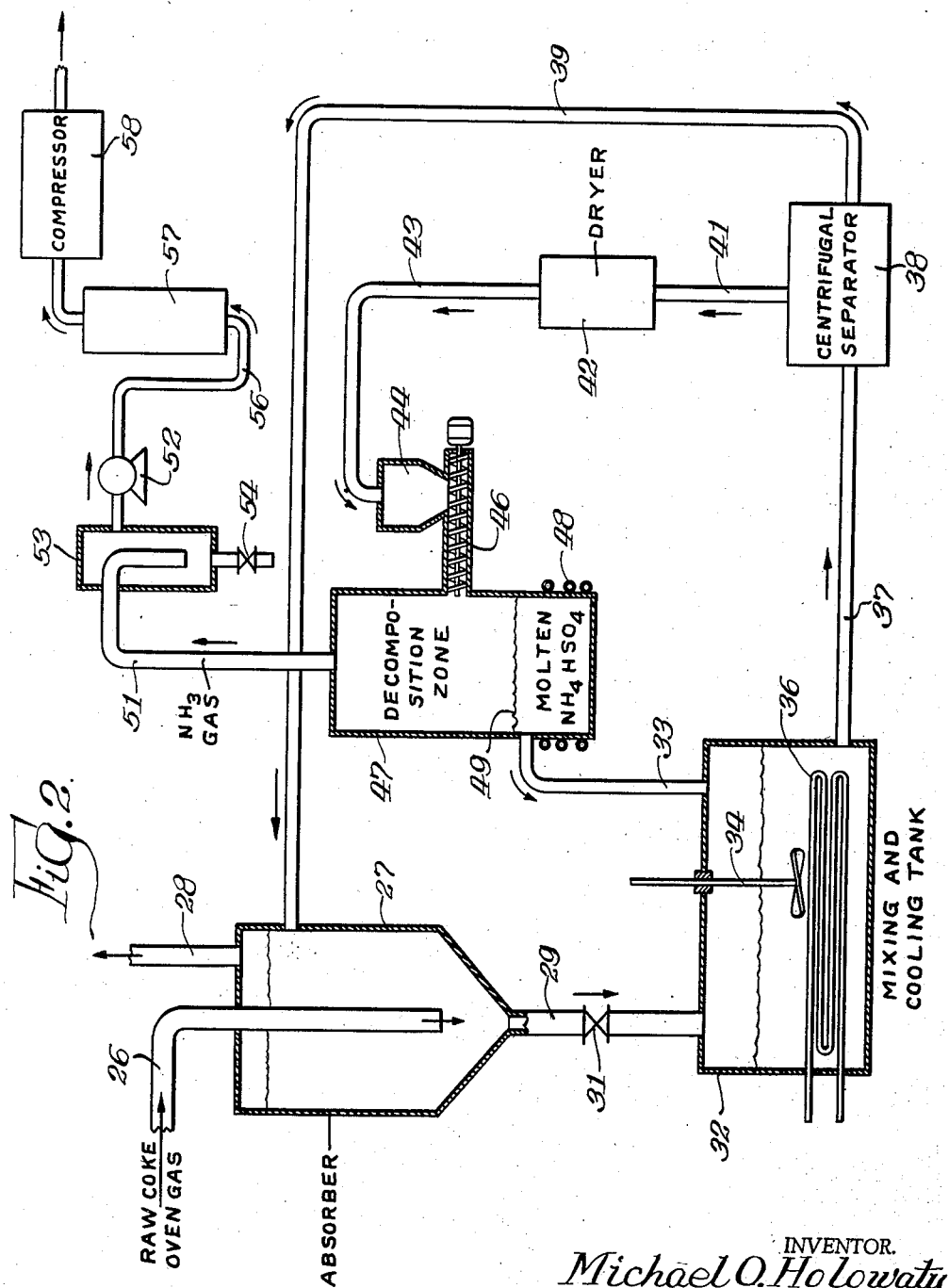

2,899,277

RECOVERY OF AMMONIA FROM COKE OVEN GAS

Michael O. Holowaty, Gary, Ind., assignor to Inland Steel Co., Chicago, Ill., a corporation of Delaware Application August 9, 1957, Serial No. 677,317

8 Claims. (Cl. 23—196)

This invention relates to improvements in the recovery of the ammonia content of coke oven gases or the like. More particularly, the invention relates to an improved process for the recovery of anhydrous ammonia from such gases.

In connection with the production of coke it is common practice to recover ammonia and other valuable by-products from the coke oven gases. In the usual procedure the coke oven gas is contacted with sulfuric acid in a so-called "saturator" and the ammonia content of the gas reacts with the sulfuric acid to form ammonium sulfate crystals which are eventually separated from the acid liquor. The usual practice is to transfer a slurry of acid liquor and ammonium sulfate crystals from the saturator to a centrifugal separator wherein the solid crystals are separated from the acid liquor, the latter being returned to the saturator along with fresh or make-up acid.

However, this conventional process for the recovery of ammonia from coke oven gas consumes large quantities of expensive sulfuric acid and is limited to the recovery of ammonia in the form of ammonium sulfate. Consequently, under certain conditions the process may not be economically attractive, e.g. when the price of sulfuric acid is high and when there is an excess of available ammonium sulfate on the market or a shortage of storage facilities. The present invention involves a somewhat different recovery scheme wherein an aqueous ammonium bisulfate solution is used for the absorption of ammonia from coke oven gas with the resultant production of ammonium sulfate crystals which are then separated and thermally decomposed to yield ammonium bisulfate which can be returned to the absorption step and ammonia gas which can be purified and liquefied to yield anhydrous ammonia. As will readily be understood, such process does not consume sulfuric acid and furthermore the ammonia content of the coke oven gas is recovered in the form of valuable anhydrous ammonia for which there is frequently a more convenient or more profitable market. As will appear hereinafter in greater detail, I have found that by means of certain innovations in the process flow, particularly in connection with the separation of ammonium sulfate crystals from the absorption step and the recycle of ammonium bisulfate, it is possible to obtain a much simpler and improved operation of the process on a continuous scale.

Accordingly, a primary object of the invention is to provide an improved process for recovering the ammonia content of coke oven gas or the like in the form of anhydrous ammonia as the end product.

A further object of the invention is to provide an improved process for the treatment of coke oven gas or the like to recover the ammonia content of the gas without consuming sulfuric acid.

Another object of the invention is to provide important operating improvements in the process of recovering ammonia from coke oven gas or the like by the use of an aqueous ammonium bisulfate solution as the absorbing agent.

Other objects and advantages of the invention will become apparent from the subsequent detailed description taken in conjunction with the accompanying drawings, wherein:

Fig. 1 is a block flow diagram illustrating the principles of the invention, and Fig. 2 is a generally schematic illustration showing one arrangement of apparatus suitable for carrying out the invention.

Referring first to Fig. 1, raw coke oven gas is introduced through a line 10 to a zone 11 wherein the ammonia content of the gas reacts with aqueous ammonium bisulfate introduced to the zone 11 through a line 12. The reaction is exothermic and results in the formation of ammonium sulfate as follows:

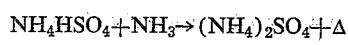

$$NH_4HSO_4 + NH_3 \rightarrow (NH_4)_2SO_4 + \Delta$$

Unreacted off gases are removed through a line 12a.

Ammonium sulfate has only limited solubility in water whereas ammonium bisulfate has practically unlimited solubility. Consequently, as ammonia gas continues to be introduced into the absorber or saturator 11, the aqueous solution of ammonium bisulfate rapidly becomes saturated with respect to ammonium sulfate and the latter therefore precipitates or crystallizes out. A slurry containing ammonium sulfate crysatals passes through a line 13 to a mixing zone 14 which is also preferably a cooling zone. In this zone additional quantities of the difficultly soluble ammonium sulfate are caused to crystallize out from the aqueous solution for reasons described below. The slurry with its increased content of ammonium sulfate crystals is then passed through a line 16 to a separator 17, which may conveniently comprise a centrifugal device. In the separator 17, the ammonium sulfate crystals are separated from the aqueous ammonium bisulfate liquor, the latter being recycled through the line 12 to the absorber or saturator 11.

From the separator 17 the crystalline ammonium sulfate passes through a line 18 to a thermal decomposition zone 19. Here the ammonium sulfate crystals are heated to a controlled uniform temperature so as to effect decomposition to ammonium bisulfate and ammonia gas as follows:

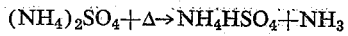

$$(NH_4)_2SO_4 + \Delta \rightarrow NH_4HSO_4 + NH_3$$

The ammonia gas is removed as at 21 and is then purified and liquefied in a zone 22 to provide anhydrous liquid ammonia at 23 as the end product of the process.

The ammonium bisulfate which results from the decomposition reaction in zone 19 is passed directly in molten or fused form through a line 24 to the zone 14 and is commingled with the slurry from the absorber 11. As a result of this addition of molten ammonium bisulfate to the zone 14, the solubility product of the dissolved ammonium sulfate in the slurry being supplied to the zone 14 from the saturator 11 is exceeded by reason of the common ion effect and precipitation of ammonium sulfate occurs. In other words, the addition of the highly soluble ammonium bisulfate through the line 24 to the aqueous liquor from the absorber 11, which is substantially saturated with the difficultly soluble ammonium sulfate, causes dissociation or ionization of the ammonium sulfate to be repressed and thereby results in precipitation of further quantities of undissociated ammonium sulfate. The provision of cooling in zone 14 is also desirable to offset the heat added by the molten ammonium bisulfate and also to diminish the solubility of ammonium sulfate still further.

This feature of providing a separate mixing or mixing and cooling zone 14 to receive the aqueous slurry from the absorber 11 and returning molten or fused ammonium bisulfate from the decomposition zone 19 directly to the zone 14 constitutes the essential novel feature of the present invention. As a result of this arrangement, it will be seen that the process is designed to effect maximum separation of ammonium sulfate crystals from the absorption liquor. In the zone 11, ammonium sulfate crystals are precipitated out by reason of the continuous introduction of ammonia gas into the absorption liquor which is saturated with respect to ammonium sulfate. The slurry which passes through the line 13 to the zone 14 is still saturated with respect to ammonium sulfate, and additional amounts of ammonium sulfate are then caused to crystallize out in the zone 14 by the introduction of the highly soluble ammonium bisulfate in molten or fused form into the zone 14, and preferably also by the decrease in solubility due to cooling. Although it has been recognized heretofore that aqueous ammonium bisulfate is an effective solution for the absorption of ammonia from coke oven gas and that the resultant ammonium sulfate can be thermally decomposed to yield ammonium bisulfate, nevertheless no one heretofore has suggested or appreciated the fact that a greatly enhanced recovery of ammonium sulfate crystals can be realized by the provision of the mixing or mixing and cooling zone 14 with the return of molten ammonium bisulfate directly to this zone. In addition, the invention affords a highly convenient and simplified scheme for reusing the ammonium bisulfate since otherwise the molten salt must be withdrawn, allowed to solidify, crushed or pulverized, and then dissolved in water to form an aqueous solution for use in the absorber 11.

Referring now to Fig. 2, the process will be described in connection with a schematic arrangement of apparatus of a type generally suitable for practicing the invention. Thus, the raw coke oven gas is introduced through an inlet pipe 26 and is bubbled through a body of aqueous ammonium bisulfate solution contained in an absorber or saturator 27. The unabsorbed gases are removed through a line 28 to waste or further processing as the case may be. A slurry comprising ammonium sulfate crystals in an aqueous solution of unreacted ammonium bisulfate, the solution also being substantially saturated with ammonium sulfate, is removed through discharge line 29 having a valve 31 and is introduced directly into a mixing vessel 32. Molten or fused ammonium bisulfate, obtained as hereinafter described, is also introduced into the vessel 32 through a line 33. A stirrer or agitating device 34 is provided for insuring intimate mixing of the materials charged to the vessel 32. Preferably, the contents of the vessel 32 are also subjected to cooling, as by a cooling coil 36, in order to remove at least the heat introduced through the molten ammonium bisulfate and preferably to lower the temperature of the slurry even further so as to throw out more ammonium sulfate.

The temperature of the slurry as removed from the saturator through the line 29 will generally be on the order of from about 120° F. to about 150° F., and in the mixing and cooling zone 32 the temperature is preferably reduced below about 100° F. for optimum results. Usually, the circulation of cooling water through the coil 36 will be sufficient to accomplish the desired degree of cooling but other cooling media may also be used when necessary.

As previously described, additional quantities of ammonium sulfate crystals are precipitated from the aqueous liquor portion of the slurry by the cooling and by the introduction of the molten readily soluble ammonium bisulfate through the line 33. The slurry containing the increased quantity of precipitated ammonium sulfate crystals is withdrawn through a conduit 37 and is passed through a centrifuge indicated schematically at 38. From the centrifuge 38 the separated aqueous liquor portion of the slurry which has been replenished by the addition of ammonium bisulfate to the vessel 32 is continuously returned through a line 39 to the absorber or saturator 27. The solid ammonium sulfate crystals from the centrifuge 38 may be withdrawn through a line 41, subjected to additional drying in a dryer 42, and thence passed through a line 43 to a supply hopper 44 which is designed to hold a sufficient quantity of ammonium sulfate crystals to insure continuous uniform operation in the thermal decomposition step.

A screw feeder 46 charges the ammonium sulfate crystals at a predetermined rate to a thermal decomposition zone 47 which may be externally heated, for example by an electric heating coil 48, to maintain a substantially uniform temperature which may range from about 550° F. to about 750° F. dependent upon the pressure conditions. At substantially atmospheric pressure good results are obtained at a temperature of from about 650° F. to about 675° F. It is quite important that the temperature be carefully controlled so as to obtain optimum decomposition of ammonium sulfate to ammonium bisulfate and ammonia without excessive decomposition of the ammonium bisulfate to ammonia, sulfur dioxide and sulfur trioxide. In general, it has been found that a highly satisfactory uniform decomposition reaction can be obtained by maintaining a molten bath of ammonium bisulfate in the lower part of the decomposition vessel and controlling the rate of withdrawal of molten ammonium bisulfate through the line 33 as well as the rate of introduction of ammonium sulfate by the screw feeder 46 so as to maintain the level of the molten bath, designated at 49, substantially constant.

The ammonia gas produced in the decomposition zone 47 is removed through a line 51 by means of a pump or blower 52 and is thereby drawn through a suitable purification zone designated at 53. Although only one such zone 53 is shown, it will be understood that a plurality of absorption towers arranged in series may be employed for the purpose of removing moisture, ammonia liquor, tars, and traces of sulfur dioxide and sulfur trioxide which are produced in the decomposition zone 47. The impurities thus removed in the zone 53 are withdrawn through a line 54 and disposed of along with other coke plant by-products. The purified ammonia gas stream passes from the pump 52 through a line 56 into a drying tower 57 and then into a compressor 58 where the ammonia is liquefied in the customary manner.

Although the invention has been described and illustrated with particular reference to certain specific embodiments thereof, it is to be understood that various modifications and alternatives may be resorted to without departing from the scope of the invention as defined in the appended claims.

I claim:
1. In the process of recovering ammonia from an ammonia-containing gas including the steps of reacting said gas with aqueous ammonium bisulfate liquor in a reaction zone to form ammonium sulfate, effecting separation of ammonium sulfate from said liquor, recycling said liquor to the reaction zone, thermally decomposing said ammonium sulfate in a decomposition zone to form ammonia and ammonium bisulfate, recovering said ammonia, and returning said ammonium bisulfate for reuse in said reaction zone; the improvement which comprises withdrawing from said reaction zone a slurry of ammonium sulfate crystals in said liquor, and commingling molten ammonium bisulfate from said decomposition zone with said slurry prior to said separation whereby to effect precipitation of additional ammonium sulfate crystals from said liquor and whereby to dissolve the ammonium bisulfate in said liquor for return to the reaction zone.

2. In the process of recovering ammonia from an ammonia-containing gas including the steps of reacting said gas with aqueous ammonium bisulfate liquor in a reaction zone to form ammonium sulfate, effecting separation of ammonium sulfate from said liquor, recycling said liquor to the reaction zone, thermally decomposing said ammonium sulfate in a decomposition zone to form ammonia and ammonium bisulfate, recovering said ammonia, and returning said ammonium bisulfate for reuse in said reaction zone; the improvement which comprises withdrawing from said reaction zone a slurry of ammonium sulfate crystals in said liquor, introducing said slurry into a mixing zone, passing ammonium bisulfate in molten form from said decomposition zone into said mixing zone and mixing the same with said slurry whereby to effect precipitation of additional ammonium sulfate crystals from said liquor and whereby to dissolve the ammonium bisulfate in said liquor for return to the reaction zone, and thereafter passing the slurry with its increased content of ammonium sulfate crystals to a separator to effect said separation.

3. In the process of recovering ammonia from an ammonia-containing gas including the steps of reacting said gas with aqueous ammonium bisulfate liquor in a reaction zone to form ammonium sulfate, effecting separation of ammonium sulfate from said liquor, recycling said liquor to the reaction zone, thermally decomposing said ammonium sulfate in a decomposition zone to form ammonia and ammonium bisulfate, recovering said ammonia, and returning said ammonium bisulfate for reuse in said reaction zone; the improvement which comprises withdrawing from said reaction zone a slurry of ammonium sulfate crystals in said liquor, said liquor being substantially saturated with ammonium sulfate, mixing molten ammonium bisulfate from said decomposition zone with said slurry and thereby effecting precipitation of additional ammonium sulfate crystals from said liquor by the common ion effect, and subsequently effecting said separation.

4. In the process of recovering ammonia from an ammonia-containing gas including the steps of reacting said gas with aqueous ammonium bisulfate liquor in a reaction zone to form ammonium sulfate, effecting separation of ammonium sulfate from said liquor, recycling said liquor to the reaction zone, thermally decomposing said ammonium sulfate in a decomposition zone to form ammonia and ammonium bisulfate, recovering said ammonia, and returning said ammonium bisulfate for reuse in said reaction zone; the improvement which comprises withdrawing from said reaction zone a slurry of ammonium sulfate crystals in said liquor, maintaining a molten bath of ammonium bisulfate in said decomposition zone, feeding separated ammonium sulfate at a controlled rate to said bath and heating the same to a temperature sufficient to effect decomposition to ammonia and ammonium bisulfate without excessive decomposition to oxides of sulfur, withdrawing molten ammonium bisulfate from said decomposition zone at a controlled rate so correlated with the feed rate of ammonium sulfate thereto as to maintain the level of said bath substantially constant in said decomposition zone, and commingling the withdrawn molten ammonium bisulfate with said slurry prior to said separation whereby to effect precipitation of additional ammonium sulfate crystals from said liquor and whereby to dissolve the ammonium bisulfate in said liquor for return to the reaction zone.

5. The process of claim 4 wherein the temperature in said decomposition zone is from about 550° F. to about 750° F.

6. In the process of recovering ammonia from an ammonia-containing gas including the steps of reacting said gas with aqueous ammonium bisulfate liquor in a reaction zone to form ammonium sulfate, effecting separation of ammonium sulfate from said liquor, recycling said liquor to the reaction zone, thermally decomposing said ammonium sulfate in a decomposition zone to form ammonia and ammonium bisulfate, recovering said ammonia, and returning said ammonium bisulfate for reuse in said reaction zone; the improvement which comprises withdrawing from said reaction zone a slurry of ammonium sulfate crystals in said liquor, and simultaneously cooling said slurry and commingling therewith molten ammonium bisulfate from said decomposition zone prior to said separation whereby to effect increased precipitation of ammonium sulfate crystals from said liquor and whereby to dissolve the ammonium bisulfate in said liquor for return to the reaction zone.

7. The process of claim 2 further characterized in that said mixing zone is also provided with cooling means and the temperature of the slurry therein is reduced to less than about 100° F. whereby increased precipitation of ammonium sulfate crystals from said slurry is obtained by the combined action of decreased temperature and the common ion effect.

8. The process of claim 4 further characterized by the step of cooling said slurry while said molten ammonium bisulfate is commingled therewith whereby to remove at least the heat introduced with said molten ammonium bisulfate.

References Cited in the file of this patent

UNITED STATES PATENTS 1,065,566  Tufts _____ June 24, 1913

FOREIGN PATENTS 6,983 of 1844  Great Britain _____ Jan. 29, 1885